United States Patent
Kang

(10) Patent No.: US 7,044,385 B2
(45) Date of Patent: May 16, 2006

(54) APPARATUS AND METHOD FOR ESTABLISHING DATA TRANSFER MODE THROUGH IDENTIFICATION OF CARD INSERTION

(75) Inventor: Shin-wook Kang, Suwon-si (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 203 days.

(21) Appl. No.: 10/600,431

(22) Filed: Jun. 23, 2003

(65) Prior Publication Data

US 2004/0016808 A1    Jan. 29, 2004

(30) Foreign Application Priority Data

Jul. 27, 2002    (KR) ..................... 10-2002-0044504

(51) Int. Cl.
*G06K 19/00*    (2006.01)
(52) U.S. Cl. ..................................... 235/487; 235/380
(58) Field of Classification Search ................ 235/375, 235/380, 487, 488, 492
See application file for complete search history.

(56) References Cited

U.S. PATENT DOCUMENTS 5,434,395 A * 7/1995 Storck et al. ............... 235/380

FOREIGN PATENT DOCUMENTS

CN    1307281 A    8/2001

* cited by examiner

*Primary Examiner*—Karl D. Frech
(74) *Attorney, Agent, or Firm*—Sughrue Mion, PLLC

(57) ABSTRACT

An apparatus and method for identifying whether a memory card is inserted and for constituting data for identifying the memory card using hardware are provided. The apparatus establishes a data transfer mode through identifying the insertion of a card and includes a card insertion identifier, a card assignment information receiver, and a data transfer mode establisher. The card insertion identifier identifies whether a card is inserted. The card assignment information receiver receives predetermined card assignment information from a card driver if the card insertion identifier identifies that the card is inserted. The data transfer mode establisher establishes the data transfer mode for the card based on the card assignment information. The apparatus further includes a data transfer mode releaser that if the card insertion identifier identifies in the data transfer mode that the card is no longer inserted, informs the card driver that the card is not inserted to release the data transfer mode.

39 Claims, 13 Drawing Sheets

US 7,044,385 B2

APPARATUS AND METHOD FOR ESTABLISHING DATA TRANSFER MODE THROUGH IDENTIFICATION OF CARD INSERTION

BACKGROUND OF THE INVENTION

This application claims the priority of Korean Patent Application No. 2002-44504, filed on Jul. 27, 2002, in the Korean Intellectual Property Office, the disclosure of which is incorporated herein in its entirety by reference.

1. Field of the Invention

The present invention relates to an apparatus and method for identifying whether a memory card is inserted and constituting data for identifying the memory card using hardware.

2. Description of the Related Art

With the widespread use of digital communication devices or electronic devices for processing video data and music data, various types of memory cards, which store digital data, are distributed. A memory card mainly uses a flash memory and a SmartMedia by Japanese Toshiba, a MemoryStick by Japanese Sony, a CompactFlash by U.S. Sandisk, a MultiMedia Card and a Secure Digital Card jointly developed by U.S. Sandisk and German Siemens, and the like are standardized as such a memory card. Such a memory card is a recording medium, which is used in various types of portable electronic devices such as a digital camera, an MP3 player, a handheld personal computer (HPC), a personal digital assistant (PDA), a portable phone, or the like. The memory card is a kind of digital data memory device, the application field of which is increasingly expanding.

As the use of memories increases with the use of portable devices, the use of extendable memories increases compared with memories built into the portable devices. This is advantageous to a developer in terms of reducing the unit cost of a developed product and to a user in terms of easily expanding memories.

In order to follow the above trend, the use of various types of devices, such as a Compactflash, a Secure Digital (SD)/MultiMedia card, or the like, increases. Also, a dual multimedia card has several merits such as having the small size and transmitting high-speed data, and thus the use of the dual multimedia card increases.

The greatest advantage of a conventional multimedia card is to be capable of connecting up to 30 cards at once. Nevertheless, a portable product may actually have only one slot due to the limitation in the size thereof. One or more slots in the portable product may increase the size of the portable product. In other words, since it is actually impossible for a portable device to mount 30 cards as specified in the memory card specification, most portable devices have one slot and may expand by adding a maximum of one more card. Accordingly, a series of processes of identifying several cards in the memory card specification are not necessary. Also, in an event that a card is no longer inserted in a slot while accessing (mainly reading/writing) the card, information on the card's being out of the slot cannot be identified in a host. Thus, the reliability of the controlling of the host is uncertain.

SUMMARY OF THE INVENTION

Accordingly, the present invention provides an apparatus and method for reducing the redundancy of a memory card controller by constituting data necessary for identifying a card using hardware considering a case where only one memory card is inserted to remove unnecessary preliminary operations.

The present invention also provides an apparatus and method for securing the reliability of the controlling of a host by converting an operational state into an idle state when a card comes out of a slot during access (mainly reading/writing) to the card.

According to an exemplary aspect of the present invention, there is provided an apparatus for establishing a data transfer mode through the identification of the insertion of a card. The apparatus includes a card insertion identifier, a card assignment information receiver, and a data transfer mode establisher. The card insertion identifier identifies whether a card is inserted. The card assignment information receiver receives predetermined card assignment information from a card driver if the card insertion identifier identifies that the card is inserted. The data transfer mode establisher establishes the data transfer mode for the card based on the card assignment information.

The apparatus further includes a data transfer mode releaser that if the card insertion identifier identifies in the data transfer mode that the card is no longer inserted, informs the card driver that the card is no longer inserted to release the data transfer mode.

BRIEF DESCRIPTION OF THE DRAWINGS

The above exemplary features and advantages of the present invention will become more apparent by describing in detail exemplary embodiments thereof with reference to the attached drawings in which.

DETAILED DESCRIPTION OF THE INVENTION

Hereinafter, illustrative, non-limiting embodiments of the present invention will be described in detail with reference to the attached drawings.

Figure 1:
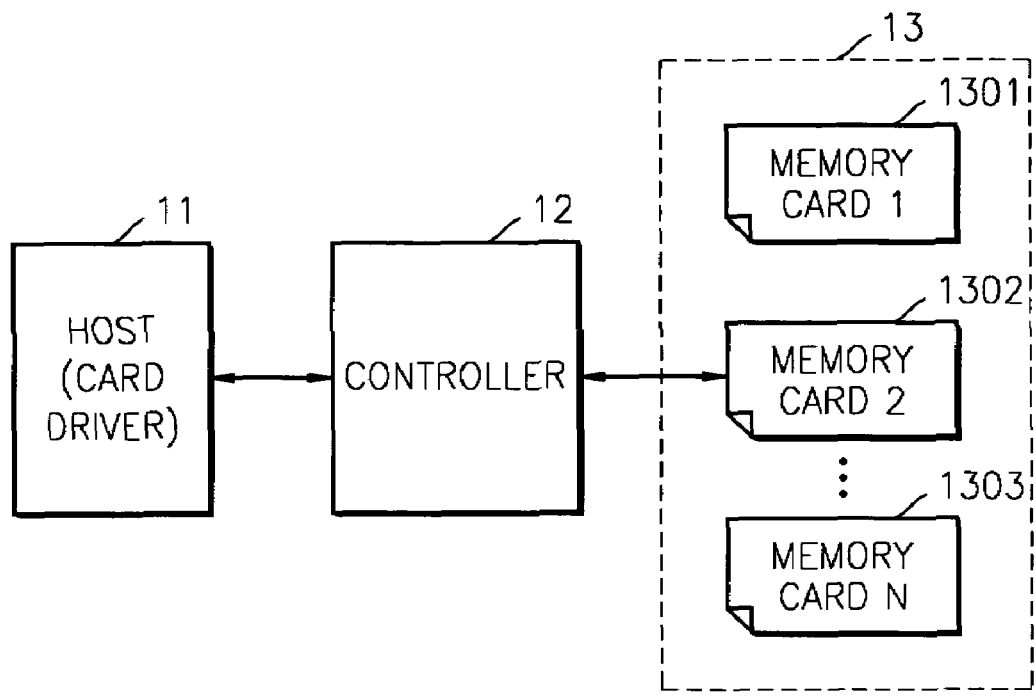
FIG. 1 is a view of a conventional memory card controlling system.

FIG. 1 illustrates a conventional memory card controlling system. Referring to FIG. 1, the memory card controlling system includes a host (card driver) 11, a controller 12, and a plurality of memory cards 1301, 1302, and 1303.

According to the standard specification of memory card, a maximum of 30 memory cards may be connected at once. A clock signal may vary to a maximum frequency of 20 MHz, and the block size of transmission data may be freely controlled. One of the plurality of memory cards 1301, 1302, and 1303 is selected according to a command of the host 11, i.e., the card driver mounted as an operating system (OS) in the host 11, to transmit and receive data to be transmitted.

Figure 2:
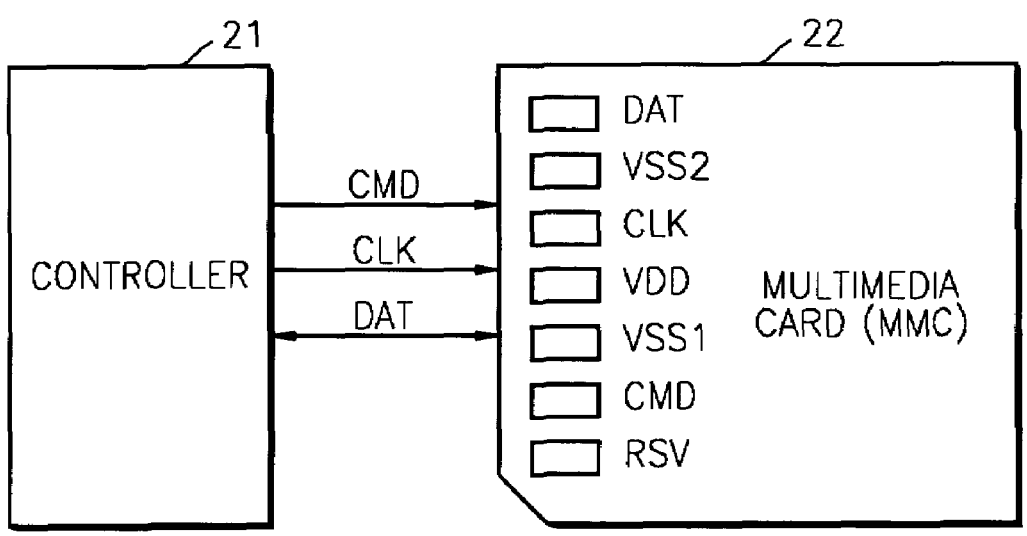
FIG. 2 is a view of pins of a conventional memory card and a conventional controller.

FIG. 2 illustrates the configuration of pins of a conventional memory card and a conventional controller. Referring to FIG. 2, the pins of a multimedia card 22 and a controller 21 include a CMD for giving a command to the memory card, a CLK for synchronous transfer, a DAT for reading/writing data, and VDD, VSS1, VSS2, and RSV (ReSerVed) for power.

The multimedia card 22 and the controller 21 are composed of a controller for controlling the multimedia card 22, a slot in which the memory card is mounted, and a wire connected to the multimedia card 22 via the slot. The state of the controller 21 is divided into a card identification state, which is a preliminary operation for reading/writing data such as obtaining data (CMD0 and CMD1) on the multimedia card 22, assigning a relative address (CMD3), or the like, and a data transfer mode for actually controlling the multimedia card 22.

Figure 3:
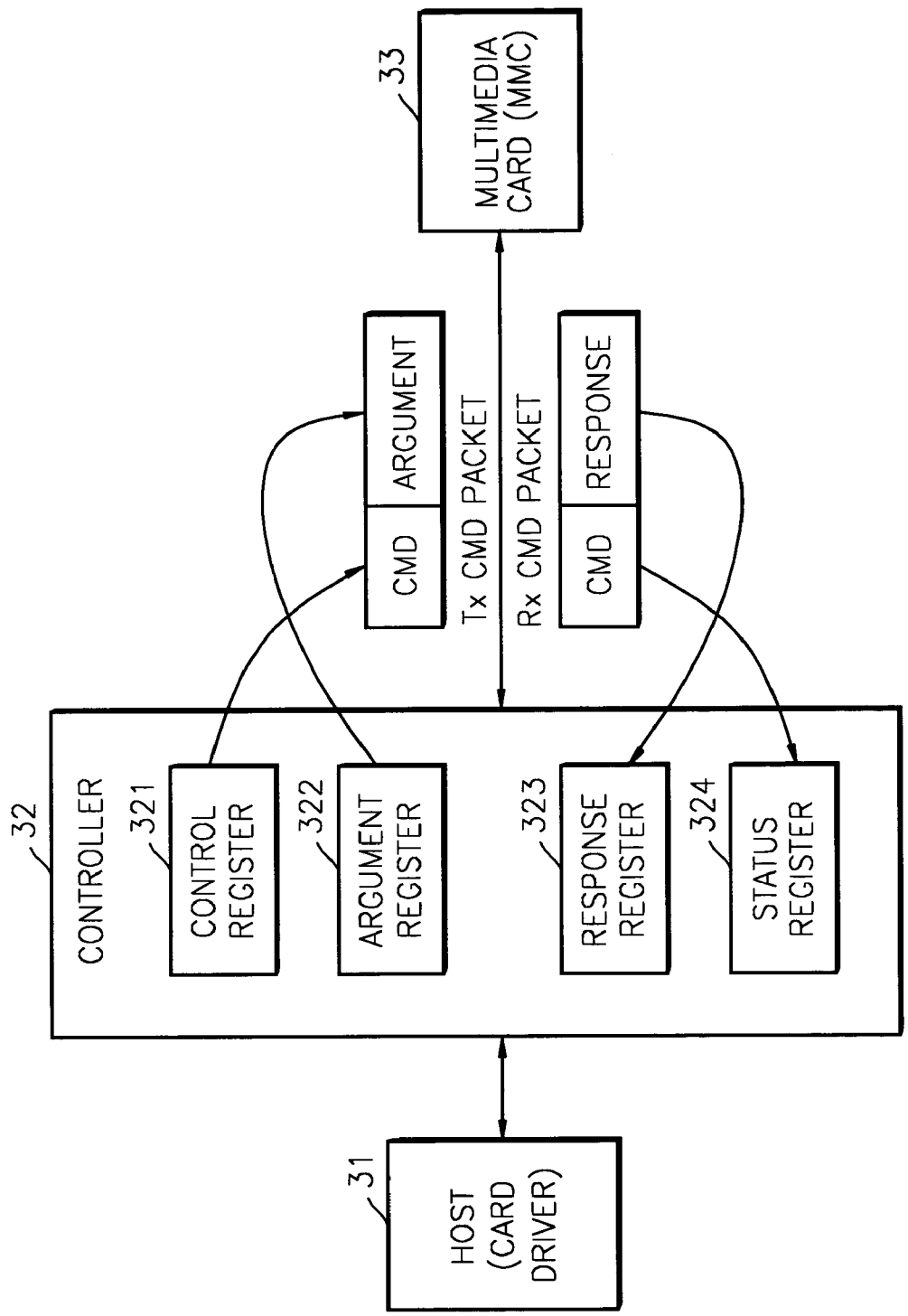
FIG. 3 is a view of the internal configuration of a conventional controller.

FIG. 3 illustrates the internal configuration of a conventional controller. Referring to FIG. 3, a controller 32 includes a control register 321, an argument register 322, a response register 323, and a status register 324.

The control register 321 controls the controller 32. In other words, after a command CMD is written into the control register 321, the controller 32 does not immediately transfer the command CMD via a CMD wire. Instead, the control register 321 packets data (CMD and argument) of a CMD packet written by a flag, which commands the start of transmission Tx, with the CMD using the flag. Then, the controller 32 transmits the packeted data and CMD. Thus, data included in a Tx CMD packet are made into a register and transmitted.

If the Tx CMD packet is transmitted to a multimedia card 33, then the memory card 33 responds. In other words, in a case of CMD1, after the CMD 1 is written in a card driver 31 mounted in a host via the control register 321 and an operation voltage range is written in the argument register 322, the card driver 31 informs the controller 32 of the start of transmission Tx via the control register 321. The Tx CMD packet is then transmitted to the multimedia card 33 via the CMD wire. Thereafter, if the multimedia card 33 can operate in the operation voltage range, an Rx CMD packet is transmitted to the controller 32 so that the controller 32 responds to the Rx CMD packet. Here, the contents of the Rx CMD packet are stored in the status register 324 of the controller 32 so as to determine which command the card driver 31 gives. The Tx CMD packet returns back as the Rx CMD. Also, a response included in the Rx CMD packet is written in the response register 323 of the controller 32. As a result, when the status register 324 finishes receiving the Rx CMD packet, the status register 324 informs the card driver 31 of completion of receiving all of the contents of the Rx CMD packet by interrupting or polling.

The control register 321 and the status register 324 are involved in the operation of the controller 32. The command of the control register 321 and the argument of the argument register 322 are transmitted with the Tx CMD packet. If the Rx CMD packet is input from the multimedia card 33 to the controller 32, the CMD of the contents of the Rx CMD packet is written in the status register 324 and the response of the contents of the Rx CMD packet is written in the response register 323.

The response is classified into R1, R2, and R3. R1 corresponds to a case where when the command CMD is transmitted, the status register 324 informs of the status of the command CMD, i.e., whether the command CMD is normally executed. R2 corresponds to a case where when the CMD2 is transmitted, an ID number (card identification information (CID) of the multimedia card 33) register of the multimedia card 33 is transmitted or card specific information (a card specific data (CSD) register of the multimedia card 33 in which data on capacity, power consumption, and the like of the multimedia card 33 is written) of the multimedia card 33 is included in the Rx CMD packet and received. R3 corresponds to a case where an operable voltage of the multimedia card 33 with respect to an assignment card voltage supplied with the CMD1, i.e., a voltage (an operation condition register (OCR) of the multimedia card 33) set by the multimedia card 33, is transmitted.

Since the response is classified into R1, R2, and R3 according to the CMD transmitted and the Rx CMD is the Rx CMD transmitted by the card driver 31, the classification of the response can be automatically identified. Also, which CMD is transmitted to the card driver 31 via the status register 324 can be identified. Thus, the whole operation is performed through a series of processes: when the card driver 31 writes an argument and a command of a Tx CMD packet to be transmitted and transmits the Tx CMD packet to the controller 32, and the card driver 31 identifies a response of multimedia card 33, i.e., the Rx CMD packet, via the controller 32.

Figure 4:
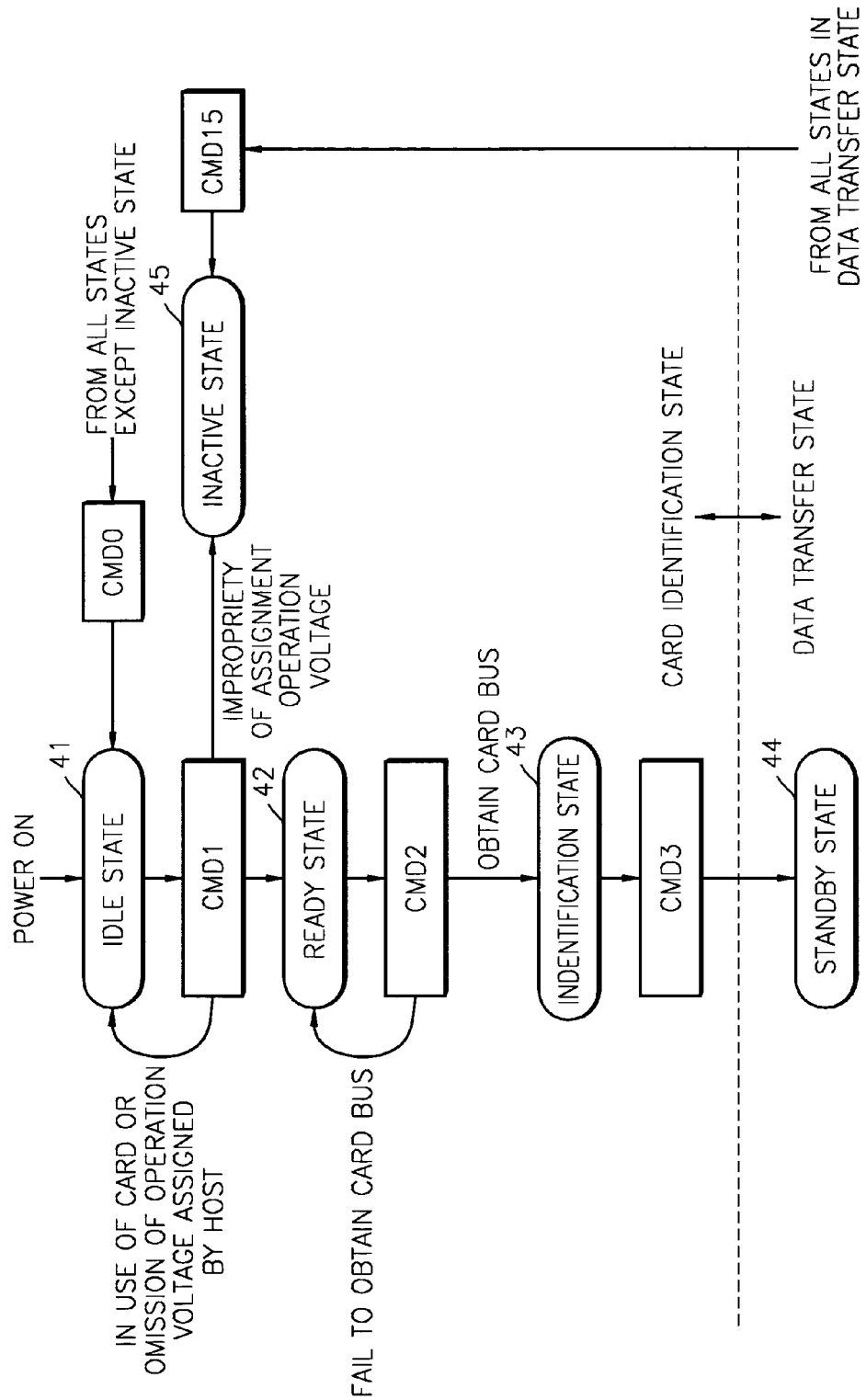
FIG. 4 is a flowchart explaining a process of establishing a data transfer mode in a conventional multimedia card.

FIG. 4 is a flowchart explaining a process of establishing a data transfer mode in a conventional multimedia card.

In a case where a memory card is mounted in a slot, the following processes have to be carried out to perform reading/writing in a data transfer mode: identifying an operation voltage range of the memory card (CMD1), identifying CID (CMD2), and assigning a relative address to the memory card (CMD3).

The detailed descriptions are as follows. When the memory card is inserted into a slot of a controller, the memory card is in an idle state 41 in which power is supplied to the memory card. In the idle state 41, a host, i.e., a card driver, identifies an operation voltage range of the memory card through the CMD1 to access the memory card. Here, the host informs the memory card of a voltage range assigned by the host via the CMD1, and if the memory card can operate within the assigned voltage range, the memory card informs the controller of an operation voltage thereof to represent a response to the CMD1. After the idle state 41, the memory card is in a ready state 42. The host checks the number of memory cards inserted into the slot of the controller.

If the memory card is a multimedia card, since 30 memory cards can be connected via a shared input/output line, the host has to repeat a process of identifying a memory card several times. Thus, the host informs the memory card of the CMD2 via the Tx CMD packet until the memory card does not respond. The memory card can transmit identification data through the CMD2 to the host to obtain information on the number of memory cards as information on the memory cards. After the above-mentioned process, the memory card is in an identification state 43. The host assigns relative numbers to the memory cards via the CMD 3 based on the number of memory cards identified via the CMD2. After the above-mentioned process, the memory card is in a standby state 44. Only one of a plurality of memory cards is selected via a CMD7.

If the memory card is inserted into the slot, the memory card is not immediately used. Instead, since the memory card has to undergo a preliminary state, i.e., the identification state 43, the host can perform a plurality of controlling operations, i.e., reading/writing/erasing/writing/protecting, in a data transfer state without repeating the previous states 41, 42, and 43. If a CMD 15 is given in the data transfer mode, the host stops the above operations, i.e., reading/writing/erasing/writing/protecting and goes to an inactive state 45. In a case of the multimedia card, in the prior art, an input/output (I/O) transmission function is not considered. Thus, mainly, the host, i.e., a controller, accesses a card, which is a slave, only in a necessary situation.

Figure 5:
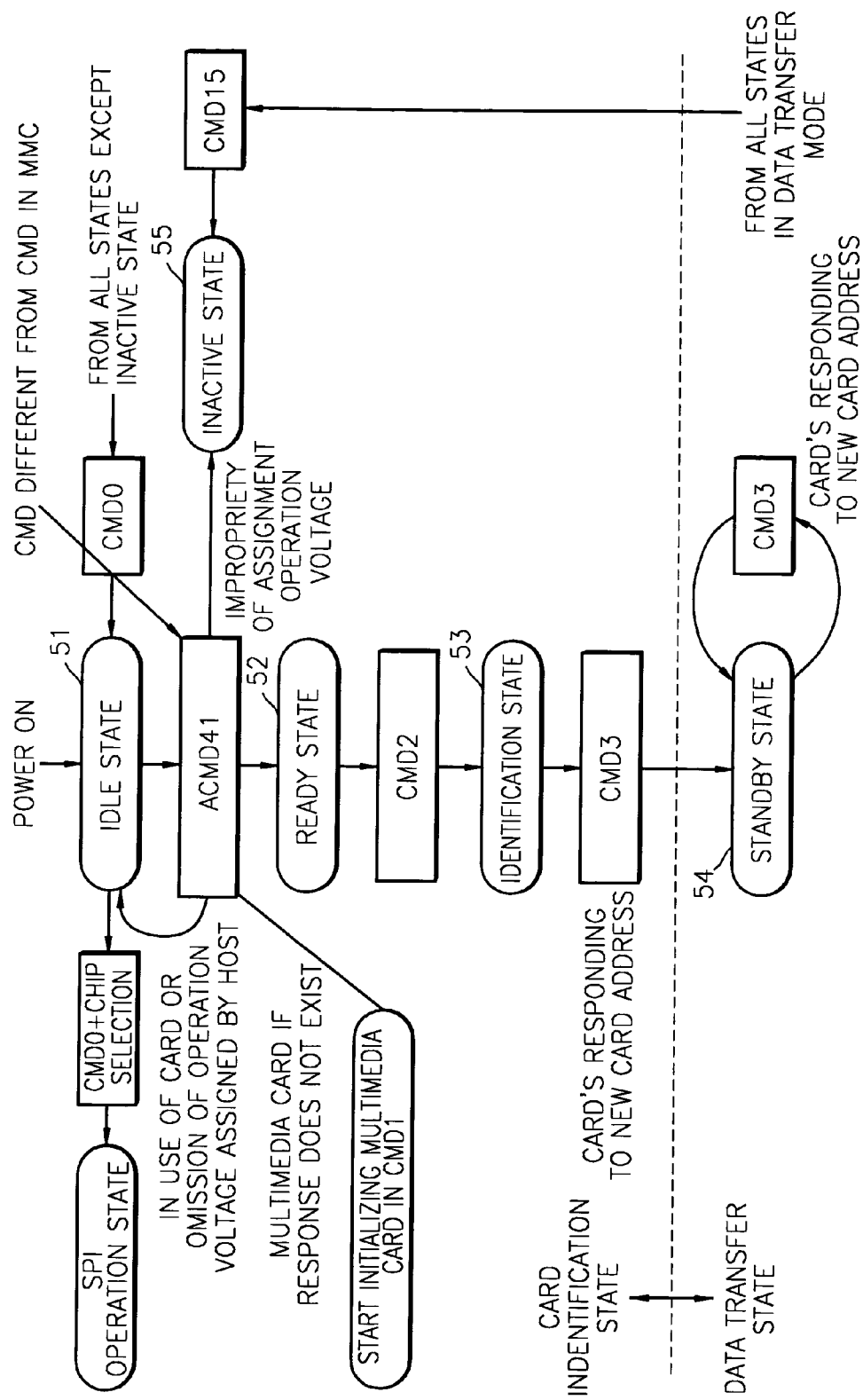
FIG. 5 is a flowchart explaining a process of establishing a data transfer mode in a conventional secure digital card.

FIG. 5 is a flowchart explaining a process of establishing a data transfer mode in a conventional secure digital card.

In order to identify an operation voltage range, the controller transmits the CMD 1 to the multimedia card, while the controller transmits an ACMD 41 to the secure digital (SD) card. Thus, the ACMD 41 is used to determine whether the memory card is a multimedia card or a SD card and identify an operation voltage range. In other words, if the ACMD 41 is transmitted to determine whether the SD card or the multimedia card is inserted into a slot and the controller responds to the ACMD 41, it is determined that the SD card is inserted into the slot. After the above-described process, the CMD2 and the CMD3 are performed to go to a data transfer state.

The difference between the multimedia card and the SD card is that the SD card is a subject establishing a relative address. In other words, in a case of the multimedia card, the host, i.e., the card driver, assigns a relative address of the multimedia card. However, in a case of the SD card, the SD card arbitrarily generates a relative address thereof and informs the card driver of the relative address. That is, since it is determined through the ACMD41 and the CMD1 whether the multimedia card or the SD card is inserted into the slot, the SD card can itself performed the operation of establishing a relative address. Also, like the multimedia card, the SD card can carry out an idle state 51, a ready state 52, an identification state 53, and a standby state 54, and then inform the card driver of the carried out result via the control register.

If in the idle state 51, a CMD0 is transmitted to the SD card, the SD card operates in a serial peripheral interface (SPI) mode. The multimedia card may operate in the SPI mode. In other words, selecting of the transmission mode of the multimedia card or the SD card can be achieved by the CMD0. The idle state 51 is changed to the SPI mode by the CMD0. This means that the physical function of a pin changes. Most of controllers do not use an SPI mode: multimedia cards use a multimedia card mode, and SD cards use a SD mode.

Figure 6:
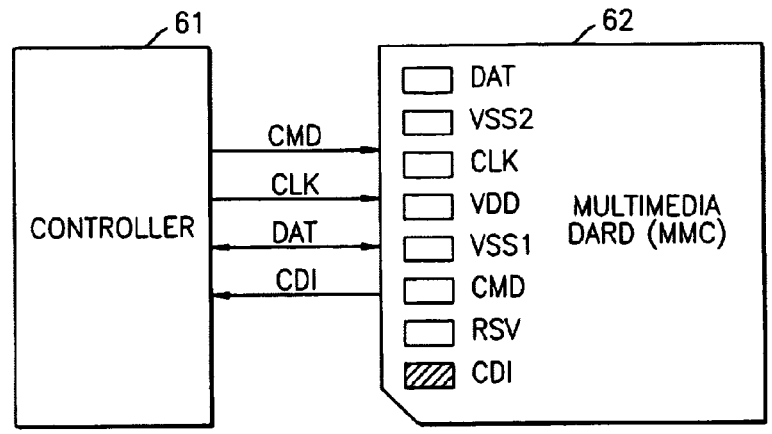
FIG. 6 is a view of pins of an apparatus for establishing a data transfer mode through the identification of the insertion of a card according to an embodiment of the present invention.

FIG. 6 illustrates the configuration of pins of an apparatus for establishing a data transfer mode through the identification of the insertion of a card.

Pins of the apparatus for establishing a data transfer mode through the identification of the insertion of a card include a CMD for giving a command to the memory card, a CLK for synchronous transfer, a DAT for reading/writing data, VDD, VSS1, VSS2, and RSV (ReSerVed) for power, and card identification (CDI) for identifying the insertion of the memory card. In other words, the physical pin CDI is assigned to a slot into which the memory card is inserted to identify the insertion of the memory card. The pin CDI has to freely return to its state so as to be attached to and detached from the apparatus. The chattering of the pin CDI can be solved by constituting a chattering preventing circuit to filter a signal and then inputting the filtered signal to a flip/flop (F/F).

A controller 61 goes from an idle state to a next state only based on whether a multimedia card 62 is inserted and expresses via the control register as if the CMD1, the CMD2, and CMD3 normally operate to maintain the compatibility.

Figure 7:
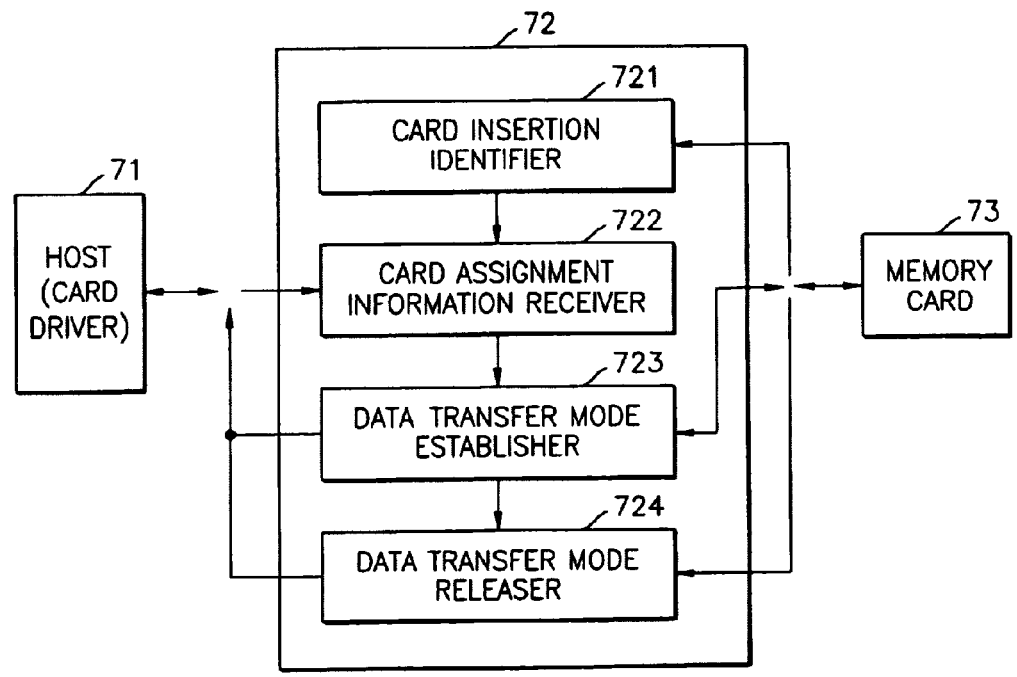
FIG. 7 is a view of an apparatus for establishing a data transfer mode through the identification of the insertion of a card according to an embodiment of the present invention.

FIG. 7 illustrates an apparatus for establishing a data transfer mode through the identification of the insertion of a card.

An apparatus 72, which establishes a data transfer mode through the identification of the insertion of a memory card 73, includes a card insertion identifier 721, a card assignment information receiver 722, a data transfer mode establisher 723, and a data transfer mode releaser 724.

The card insertion identifier 721 identifies whether the memory card 73 is inserted. If the memory card 73 is inserted into a predetermined socket, the card insertion identifier 721 receives a predetermined insertion signal from a port of the socket coupled to a port of the memory card 73 to identify that the memory card 73 is inserted. If the card insertion identifier 721 identifies the insertion of the memory card 73, the card assignment information receiver 722 receives predetermined card assignment information from a card driver 71. The data transfer mode establisher 724 establishes a data transfer mode for the memory card 73 based on the card assignment information. If the card insertion identifier 721 identifies that the memory card 73 is no longer inserted in the slot once the data transfer mode is established, the data transfer mode releaser 724 informs the card driver 71 that the memory card 73 is no longer inserted in the slot to release the data transfer mode. In the prior art, if the memory card 73 becomes uninserted in the slot while a host 71 reads the memory card 73, data being read does not exist. Thus, it can be identified whether the memory card 73 is no longer inserted in the slot. However, if the memory card 73 is no longer inserted in the slot while the host 71 writes data in the memory card 73, a burst transfer mode is supported in a multimedia card. Thus, checking whether the memory card 73 abnormally operates is not surely guaranteed. However, in the present invention, the data transfer mode releaser 724 can prevent a write error.

If the memory card 73 is a multimedia card, the card assignment information includes an assignment operation voltage that the card driver 71 assigns as an operation voltage of the memory card 73 in consideration of power distribution to the whole of the apparatus and an assignment card address that the card driver 71 arbitrarily assigns as a relative address of the memory card 73.

If the memory card 73 is a SD card, the card assignment information includes an assignment operation voltage that the card driver 71 assigns as an operation voltage of the memory card 73 in consideration of the power distribution to the whole of the apparatus and an assignment card address that the memory card 73 arbitrarily assigns as its relative address.

Figure 8:
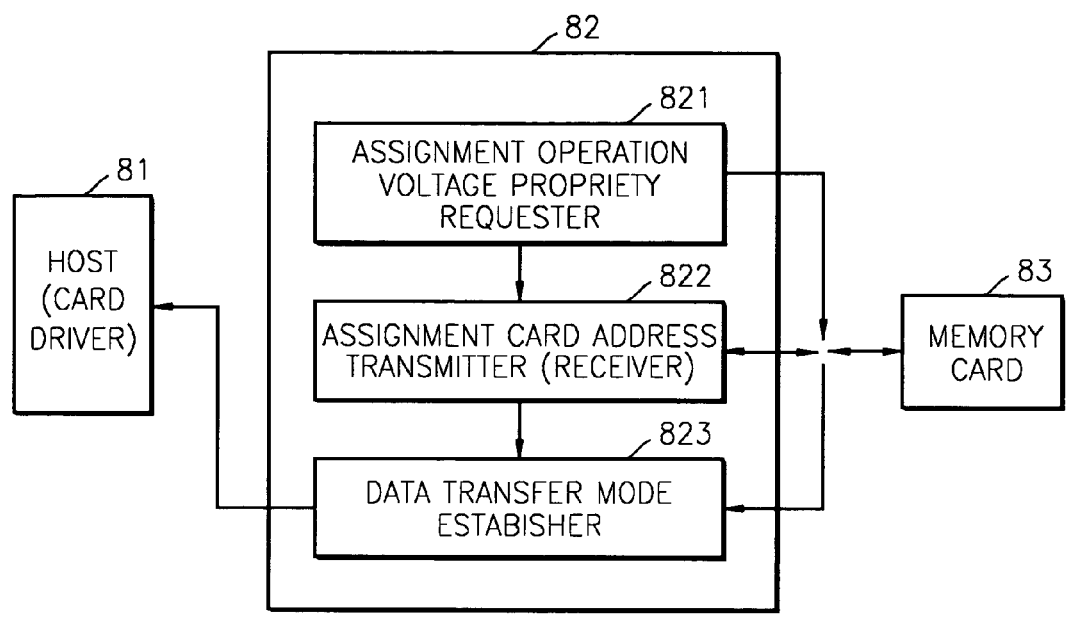
FIG. 8 is a view of an apparatus for establishing a data transfer mode through the identification of the insertion of a card according to another embodiment of the present invention.

FIG. 8 illustrates an apparatus for establishing a data transfer mode through the identification of the insertion of a card.

An apparatus 82, which establishes a data transfer mode through the identification of the insertion of a memory card 83, includes an assignment operation voltage propriety requester 821, an assignment card address transmitter or an assignment card address receiver 822, and a data transfer mode establisher 823.

If a memory card 83 is a multimedia card, the assignment operation voltage propriety requester 821 requests the memory card 83 for the propriety of an assignment operation voltage that a card driver 81 assigns as an operation voltage of the memory card 83 in consideration of power distribution to the whole system. If the assignment card address transmitter 822 receives a response to the request of the assignment operation voltage propriety requester 821 and the response indicates the propriety of the assignment operation voltage, the assignment card address transmitter 822 transmits to the memory card 83 an assignment card address that the card driver 81 arbitrarily assigns as a relative address of the memory card 83. If the data transfer mode establisher 823 receives predetermined card identification information established by the memory card 83, the data transfer mode establisher 823 transmits the card identification information to the card driver 81 to establish a data transfer mode, in which data can be read or written, according to a command of the card driver 81. If the memory card 83 can operate in the assignment operation voltage, the card identification information includes the assignment operation voltage set as an operation voltage of the memory card 83 and the assignment card address set as a relative address of the memory card 83. Also, the card identification information may further include a state for informing that the memory card 83 has been identified. However, since the identification of the memory card 83 can be checked by receiving the set operation voltage and the set card address, the card identification information may not include the state for informing that the memory card 83 has been identified. According to the standard specification of a memory card, the state for informing that the memory card 83 has been identified is included in the card identification information. In order to satisfy the standard specification of a memory card, if the response to the request of the assignment operation voltage propriety requester 821 indicates the propriety of the assignment operation voltage, the assignment card address transmitter 822 requests the memory card 83 for CID. If the assignment card address transmitter 822 receives a response to the request for CID from the memory card 83, the assignment card address transmitter 822 transmits the assignment card address to the memory card 83. The CID includes the name of a maker of the memory card 83 and an ID number of the memory card 83.

If the memory card 83 is a SD card, the assignment operation voltage propriety requester 821 requests the memory card 83 for the propriety of the assignment operation voltage that the card driver 81 assigns as an operation voltage of the memory card 83 in consideration of power distribution to the whole of the apparatus. If the assignment card address receiver 822 receives a response to the request of the assignment operation voltage requester 821 and the response indicates the propriety of the assignment operation voltage, the assignment card address receiver 822 receives an assignment card address that the memory card 83 arbitrarily assigns as a relative address of the memory card 83. If the data transfer mode establisher 823 receives predetermined card identification information set by the memory card 83, the data transfer mode establisher 823 transmits the card identification information to the card driver 81 to establish a data transfer mode, in which data can be read or written, according to a command of the card driver 81. If the memory card 83 can operate in the assignment operation voltage, the card identification information includes the assignment operation voltage set as an operation voltage of the memory card 83 and the assignment card address set as a relative address of the memory card 83. The card identification information may further include a state for informing that the memory card 83 has been identified. However, since the identification of the memory card 83 can be checked by receiving the set operation voltage and the set card address, the card identification information may not include the state for informing that the memory card 83 has been identified. According to the standard specification of a memory card, the state for informing that the memory card 83 has been identified is included in the card identification information. In order to satisfy the standard specification of a memory card, if the response to the request of the assignment operation voltage propriety requester 821 indicates the propriety of the assignment operation voltage, the assignment card address receiver 822 requests the memory card 83 for CID on the memory card 83. If the assignment card address receiver 822 receives a response to the request for CID on the memory card 83, the assignment card address receiver 822 transmits the assignment card address to the memory card 83. The CID on the memory card 83 includes the name of a maker of the memory card 83 and an ID number of the memory card 83.

Figure 9:
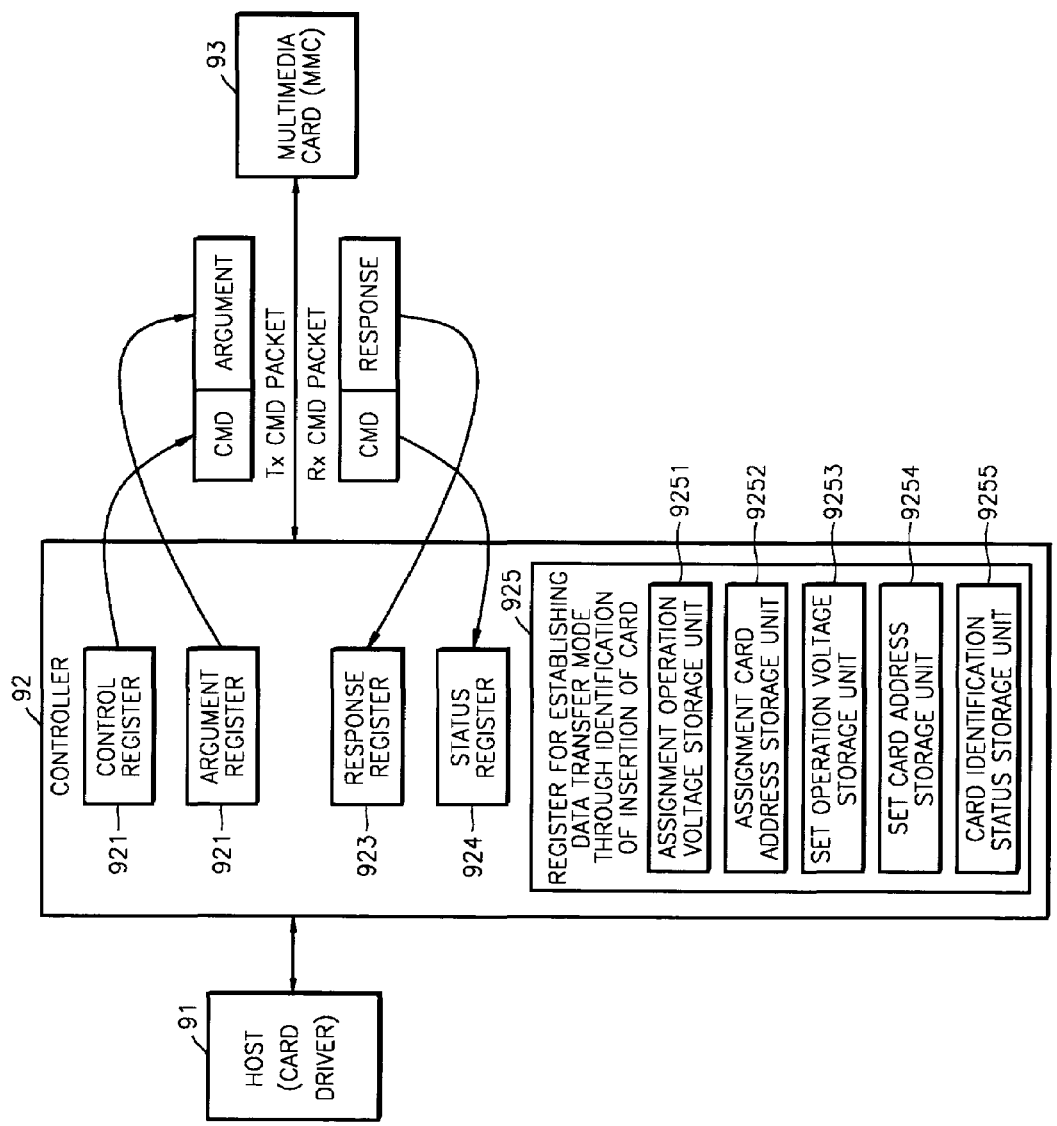
FIG. 9 is a view of a controller for establishing a data transfer mode according to an embodiment of the present invention.

FIG. 9 illustrates the internal configuration of a controller for establishing a data transfer mode according to an embodiment of the present invention. Referring to FIG. 9, a controller 92 includes a control register 921, an argument register 922, a response register 923, a status register 924, and a register 925 for establishing a data transfer mode through the identification of the insertion of a card. In the present invention, since the identification of the card is processed using hardware, the controlling of a host 91, i.e., input/output of a command, is not necessary. However, in the present invention, the register 925 is additionally included so as to be compatible with a conventional method of a host's controlling a controller.

The register 925 includes an assignment operation voltage storage unit 9251, an assignment card address storage unit 9252, a set operation voltage storage unit 9253, and a set card address storage unit 9254. The assignment operation voltage storage unit 9251 stores an assignment operation voltage. The assignment card address storage unit 9252 stores an assignment card address. The set operation voltage storage unit 9253 stores a set operation voltage. The set card address storage unit 9254 stores a set card address. The assignment operation voltage is a voltage that the card driver 91 assigns as an operation voltage of the card in consideration of power distribution to the whole of a system. If the card is a multimedia card, the assignment card address is an address that the card driver 91 arbitrarily assigns as a relative address of the card. If the card is a SD card, the assignment card address is an address that the card arbitrarily assigns as a relative address of the card. If the card can operate in the assignment operation voltage, the set operation voltage is the assignment operation voltage set as the operation voltage of the card. The set card address is the assignment card address set as the relative address of the card. According to the standard specification of a memory card, if the identification of the card is completed, status data for informing that the card has been identified is transmitted from the multimedia card 93. Thus, according to the standard specification of the memory card, a card identification status storage unit 9255, which stores a status for informing that the card has been identified, is included in the register 925.

Figure 10:
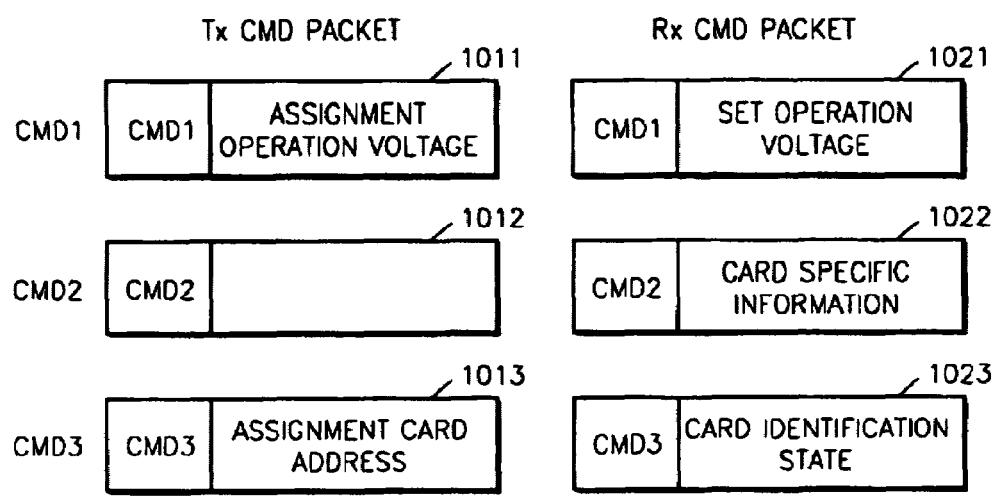
FIG. 10 is a view illustrating a Tx CMD packet and an Rx CMD packet used in the present invention.

FIG. 10 illustrates the configuration of a Tx CMD packet and an Rx CMD packet used in the present invention.

A Tx CMD packet and an Rx CMD packet, which are necessary for establishing a data transfer mode through the identification of the insertion of a card using hardware, include CMD1 1011 and 1021, CMD2 1012 and 1022, and CMD3 1013 and 1023. The Tx CMD packet has an assignment operation voltage 1011 and an assignment card address 1013, which are argument parts. The Rx CMD packet has a set operation voltage 1021, card CID 1022, and a card identification state 1023, which are response parts.

The Tx CMD packet and the Rx CMD packet are transmitted and received using the following process to identify the card. First, the assignment operation voltage 1011 and the assignment card address 1013 are written in a register of a controller, which establishes a data transfer mode. Next, a command to identify the card is given via the register of the controller. Here, if the card is inserted into a slot, the CMD1 is not given. In a conventional method using software, the CMD1 is transmitted to the card to check whether the card is inserted into the slot. If the card is inserted into the slot, the CMD1 is transmitted to identify the card.

In the CMD1, the assignment operation voltage 1011 written in the controller is transmitted with a packet and a response voltage value of the card for the assignment operation voltage 1011 is written in a set operation voltage register of the controller. If the CMD1 is successfully performed and thus the controller transmits the CMD2 in a ready state (here, a data packet being transmitted does not exist), the card transmits card specific information (e.g., CID) and stores the card specific information in the response register of the controller. After the ready state, the card goes to a card identification state and the controller performs the CMD3. Here, a relative address assigned to the card is transmitted with the Tx CMD packet. In the present invention, a case where one memory card is inserted into a slot is introduced, and thus hardware (a controller or a card) gives an arbitrary value. However, a controller for establishing a data transfer mode further includes a register for establishing a data transfer mode through the identification of the insertion of a card (in particular, the assignment card address storage unit 9252), so that software, i.e., a card driver, can perform controlling operations.

If the CMD3 is transmitted to the card, the card transmits a current status of the card with the Rx CMD packet. The current status of the card with the Rx CMD is also stored in the card identification status storage unit, which is the register for establishing the data transfer mode. After the card identification state, the controller informs software (card driver) via the card identification status storage unit that the card has been identified. If the card is mounted in the slot and thus the card identification state is performed, the controller can read the results of the card identification state, i.e., the set operation voltage 1021, the card identification information 1022, and the card identification state 1023. The card identification state is used to identify the status of the card after an operation according to a CMD. Thus, in the card identification state, only the current status of the status of the card received by the CMD3 is used as useful data. Therefore, the completing the card identification state can be identified after the controller receives the Rx CMD packet and the card driver is informed of the status of the controller. Thus, it is unnecessary to additionally store the card identification state in the controller and inform the card driver of the card identification state. However, in the above case, the operation for informing the result is performed after the card identification state. Thus, the controller has the card identification status storage unit, so that a host is compatible with conventional processes.

Figure 11:
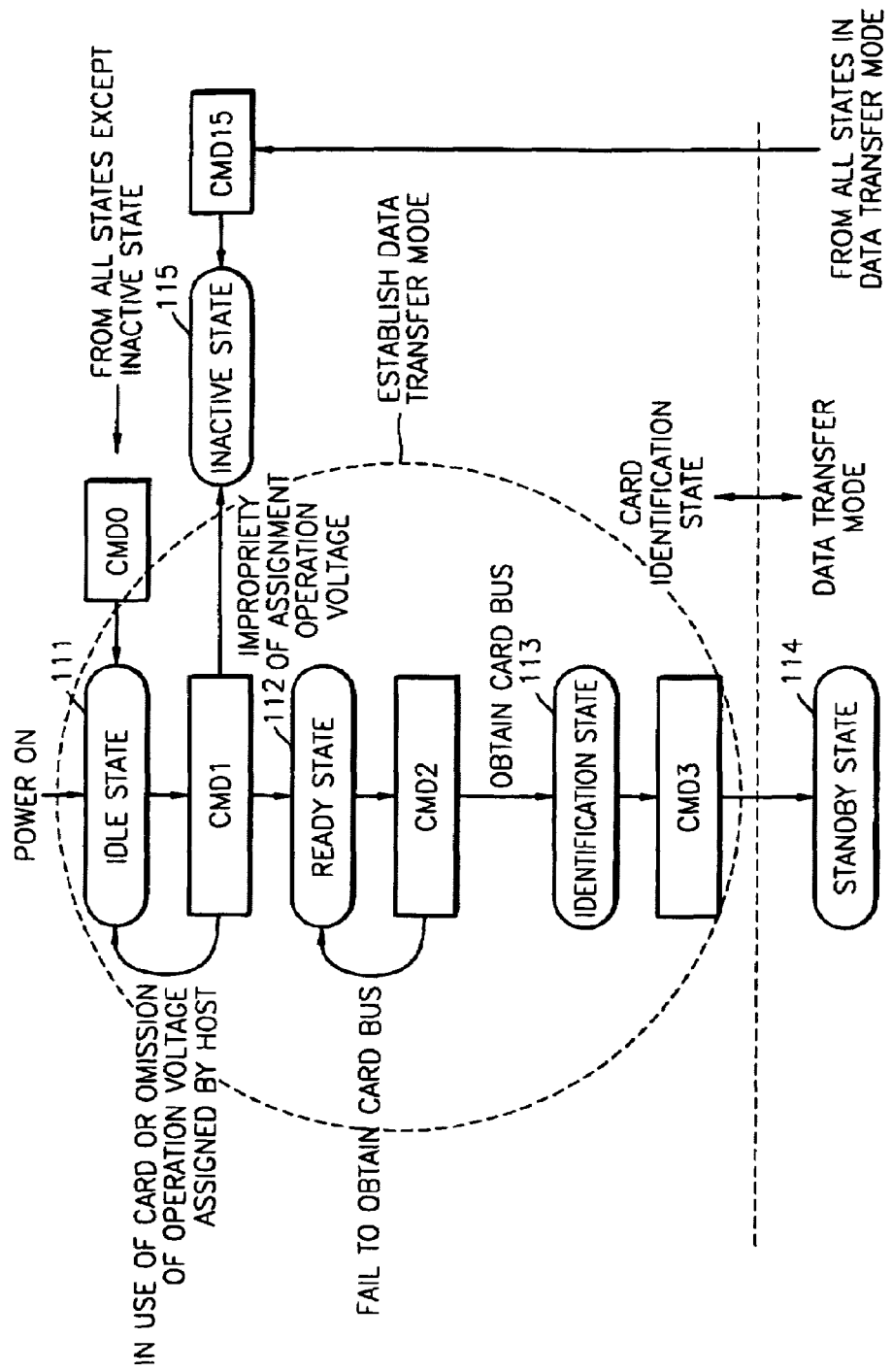
FIG. 11 is a flowchart explaining a process of establishing a data transfer mode in a multimedia card according to an embodiment of the present invention.

FIG. 11 is a flowchart explaining a process of establishing a data transfer mode in a multimedia card.

A controller for establishing the data transfer mode is in an idle state 111. The controller starts operating in the following two cases. The first case is that a card driver accesses data on the multimedia card. However, in the first case, since the card driver has to be aware of whether the multimedia card exists, data on whether the multimedia card is inserted into a slot is a priority. The present invention is applied to the second case in which if the multimedia card is inserted into the slot, the controller supplies operation voltage data corresponding to the CMD1 and relative address data related with the CMD2 and CMD3.

In other words, if the multimedia card is inserted into the slot of the controller, the multimedia is in the idle state 111 in which power is supplied to the multimedia card. The host, i.e., the card driver, has to identify an operation voltage range of the multimedia card via the CMD1 in the idle state 111 to access the multimedia card. Here, the host informs the multimedia card of a voltage range assigned by the host via the CMD1. If the multimedia card can operate within the assignment voltage range, the multimedia card informs the controller of the operation voltage range thereof to respond to the CMD1. After the idle state 111, the multimedia card is in a ready state 112. The host checks how many multimedia cards are inserted into the slot of the controller. In the present invention, one multimedia card is inserted into the slot, and thus the process of checking how many multimedia cards are inserted into the slot is not necessary. After the ready state 112, the multimedia card is in an identification state 113. The relative number determined by the card driver is assigned to the multimedia card via the CMD3. After the identification state 113, the multimedia card is in a standby state 114. Thereafter, the controller informs the card driver through interrupting or a register that the multimedia card is inserted. Also, the controller informs the card driver of data on the multimedia card, which has already been obtained by the controller. Next, the multimedia card is in a data transfer state to perform controlling operations, such as reading/writing/erasing data. If a CMD15 is given in the data transfer state, the above operations, i.e., reading/writing/erasing, stop and the multimedia card goes to an inactive state 115. Also, in the present invention, if the multimedia card becomes uninserted in the slot during reading or writing, the process goes to the idle state 111 via a pin for identifying the insertion of the multimedia card. Thus, the card driver can identify the status of the multimedia card. As described above, the idle state 111, the ready state 112, the identification state 113, and the standby state 114 are processed using hardware without the control of the card driver. Thus, the data transfer state is automatically established.

Figure 12:
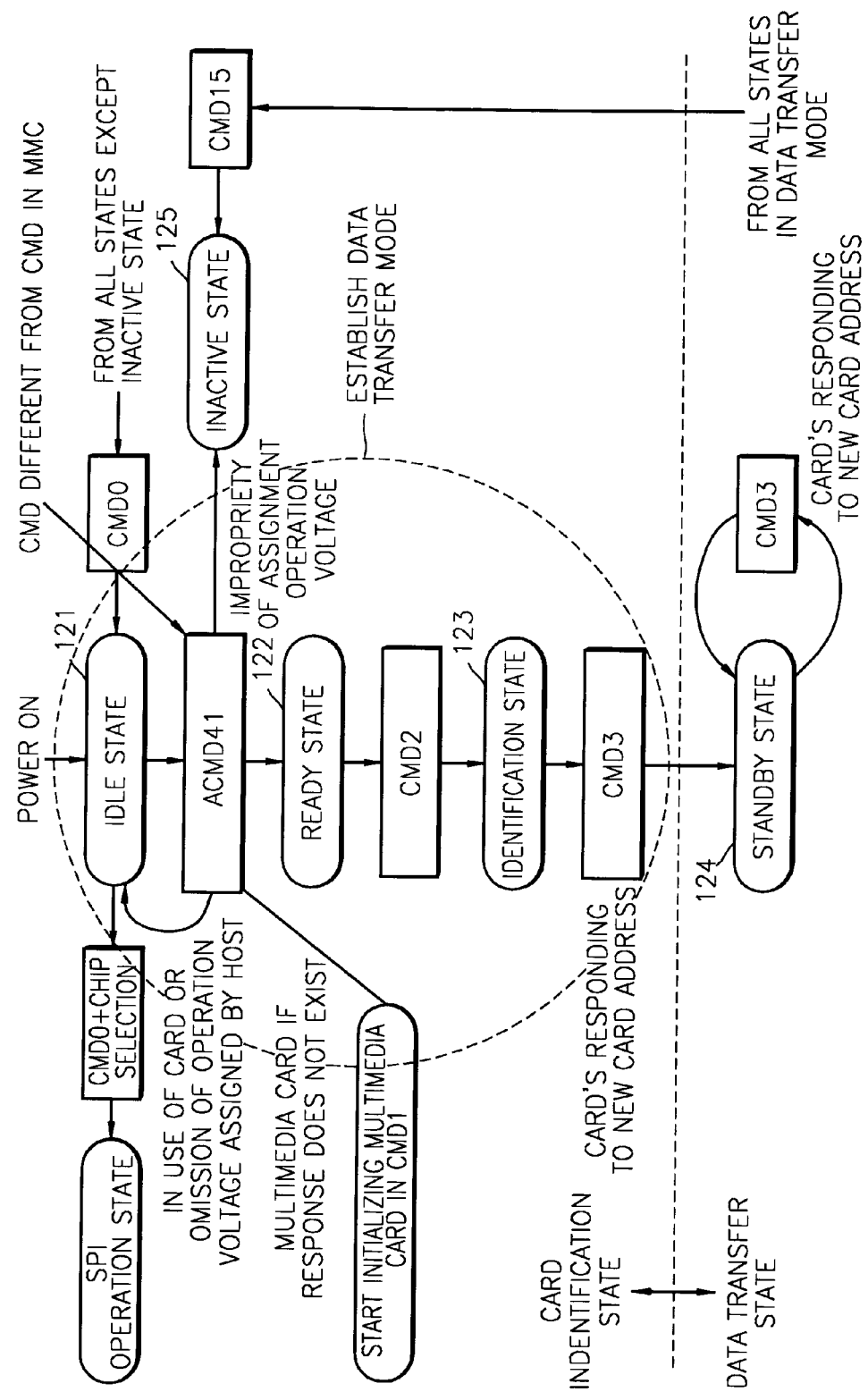
FIG. 12 is a flowchart explaining a process of establishing a data transfer mode in a secure digital card according to an embodiment of the present invention.

FIG. 12 is a flowchart explaining a process of establishing a data transfer mode in a SD card.

In order to identify an operation voltage range, in a case of the multimedia card, the controller transmits the CMD1 to the multimedia card. However, in a case of the SD card, the controller transmits the ACMD 41 to the SD card. Thus, the ACMD 41 is used to whether the memory card is the multimedia card or the SD card and to identify the operation voltage range. In other words, the controller transmits the ACMD 41 to check whether the SD card or the multimedia card is inserted. If a response the transmission of the ACMD 41 exists, it is determined that the SD card is inserted into the slot. After the above process, the CMD2 and CMD3 are performed to go to a data transfer state.

The difference between the multimedia card and the SD card is that the SD card is a subject establishing a relative address of the SD card. In other words, in a case of the multimedia card, the card driver, i.e., the host, designates a relative address of the multimedia card. However, in a case of the SD card, the SD card arbitrarily generates a relative address thereof and informs the card driver of the relative address. Since it is determined whether the memory card is the multimedia card or the SD card using the ACMD 41 and the CMD1, the SD card itself can perform the operation different from the multimedia card. Like the multimedia card, the SD card can perform the idle state 121, the ready state 122, the identification state 123, and the standby state 124 and then inform the card driver of the results of the idle state 121, the ready state 122, the identification state 123, and the standby state 124 via the control register.

If the CMD0 is transmitted to the SD card in the idle state 121, the SD card operates in an SPI mode. The multimedia card may operate in the SPI mode. In other words, selecting a transfer mode of the multimedia card or the SD card can be achieved by the CMD0. The SD card goes from the idle state 121 to the SPI mode via the CMD0. This means that the physical function of a pin changes. Most controllers do not use an SPI mode: multimedia cards use a multimedia card mode, and SD cards use a SD card mode. As described above, the idle state 121, the ready state 122, the identification state 123, and the standby state 124 are processed using hardware without the control of the card driver. Thus, the data transfer state is automatically established.

Figure 13:
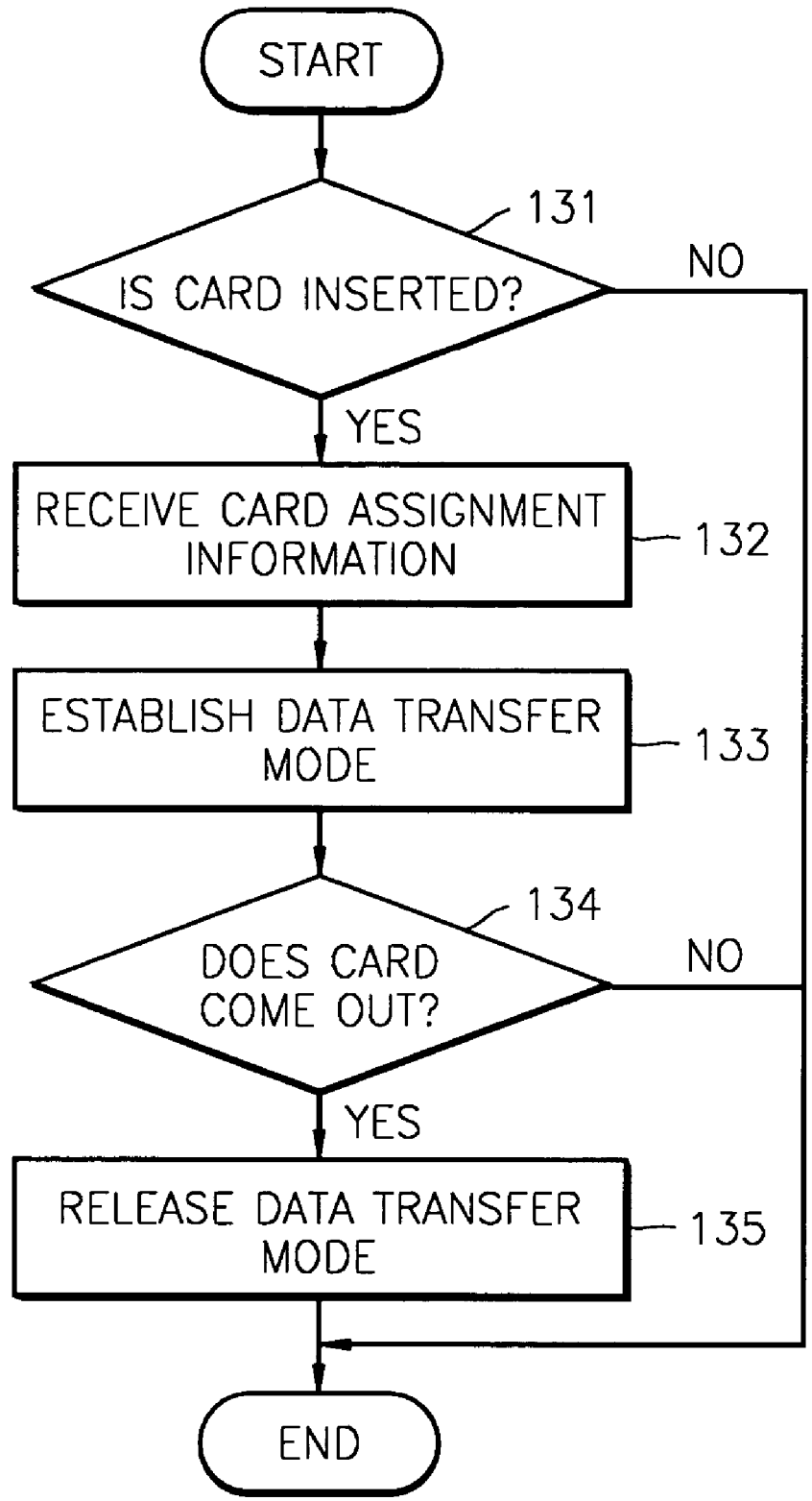
FIG. 13 is a flowchart explaining a method of establishing a data transfer mode through the identification of the insertion of a card according to an embodiment of the present invention.

FIG. 13 is a flowchart explaining a process of establishing a data transfer mode through the identification of the insertion of a card.

In step 131, it is checked whether a card is inserted. If the card is inserted into a predetermined socket, a predetermined insertion signal is received from a port of the socket coupled to a port of the card to perceive that the card is inserted. If the insertion of the card is perceived, predetermined card assignment information is received from the card driver in step 132. In step 133, a data transfer state is established for the card based on the card assignment information. If it is perceived, in step 134, that the card is no longer inserted in the socket in the data transfer state, in step 135, the card driver is informed that the card is no longer inserted in the socket to release the data transfer state.

If the card is a multimedia card, the card assignment information includes an assignment operation voltage that the card driver assigns as an operation voltage of the card in consideration of power distribution to the whole of a system and an assignment card address that the card driver arbitrarily assigns as a relative address of the card. If the card is a SD card, the card assignment information includes an assignment operation voltage that the card driver assigns as an operation voltage of the card in consideration of power distribution to the whole of a system and an assignment card address that the card arbitrarily assigns as a relative address thereof.

Figure 14:
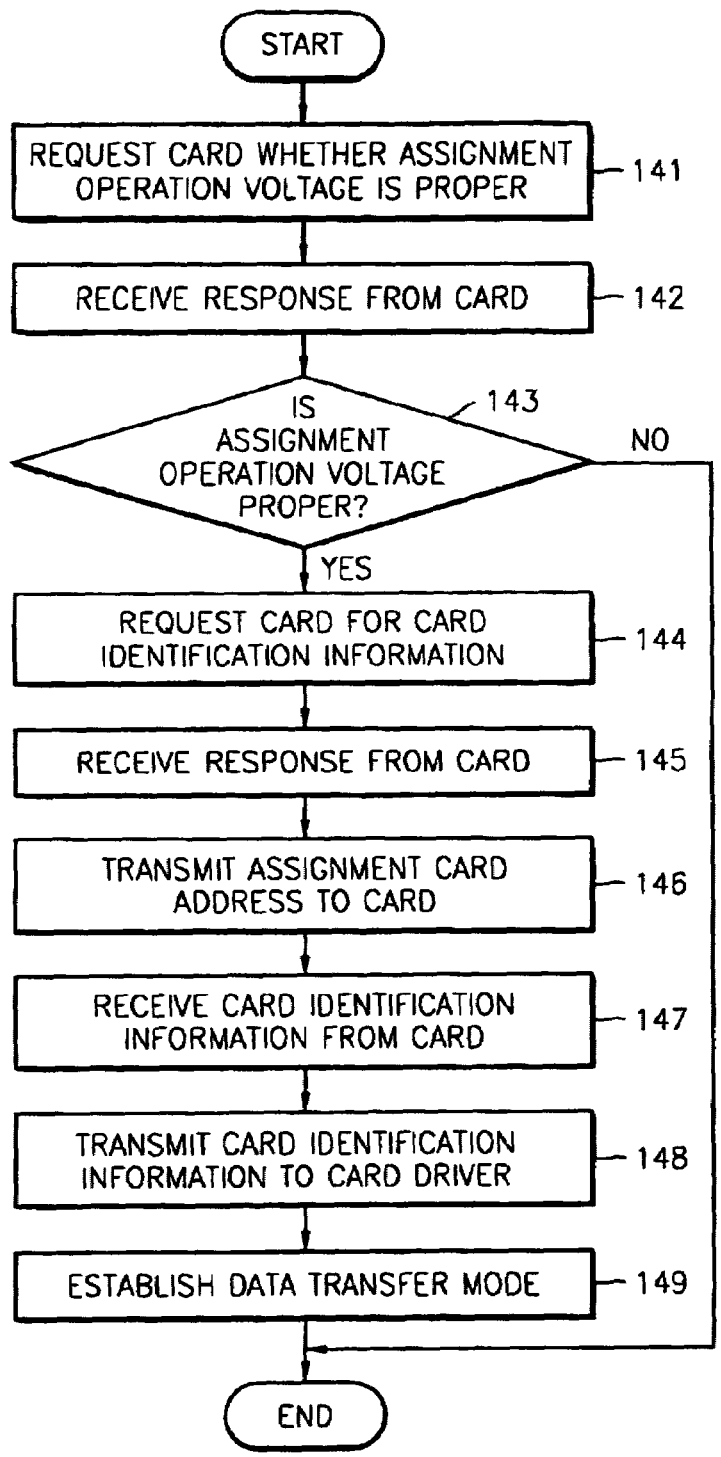
FIG. 14 is a flowchart explaining a method of establishing a data transfer mode through the identification of the insertion of a multimedia card according to an embodiment of the present invention.

FIG. 14 is a flowchart explaining a method of establishing a data transfer mode through the identification of the insertion of a multimedia card.

In step 141, the multimedia card is requested for the propriety of an assignment operation voltage that a card driver assigns as an operation voltage of the multimedia card in consideration of power distribution to the whole of a system. A response to the request is received in step 142. If in step 143, the response indicates the propriety of the assignment operation voltage, in step 146, an assignment card address that the card driver arbitrarily assigns as a relative address of the multimedia card is transmitted to the multimedia card. The following steps may be further performed to satisfy the standard specification of a memory card. In other words, if in step 143, the response to the request indicates the propriety of the assignment operation voltage, the multimedia card is requested for CID in step 144. If a response to the request for the CID is received in step 145, the assignment card address is transmitted to the multimedia card in step 146. The CID includes the name of a maker of the multimedia card and an ID number of the multimedia card. If in step 147, card identification information set by the multimedia card is received, the card identification information is transmitted to the card driver in step 148. In step 149, a data transfer mode in which data can be read or written is established according to a command of the card driver. If the multimedia card can operate within the range of the assignment operation voltage, the card identification information includes the assignment operation voltage set as an operation voltage of the multimedia card and the assignment card address set as the relative address of the multimedia card. The card identification information may further include a state for informing that the multimedia card has been identified.

Figure 15:
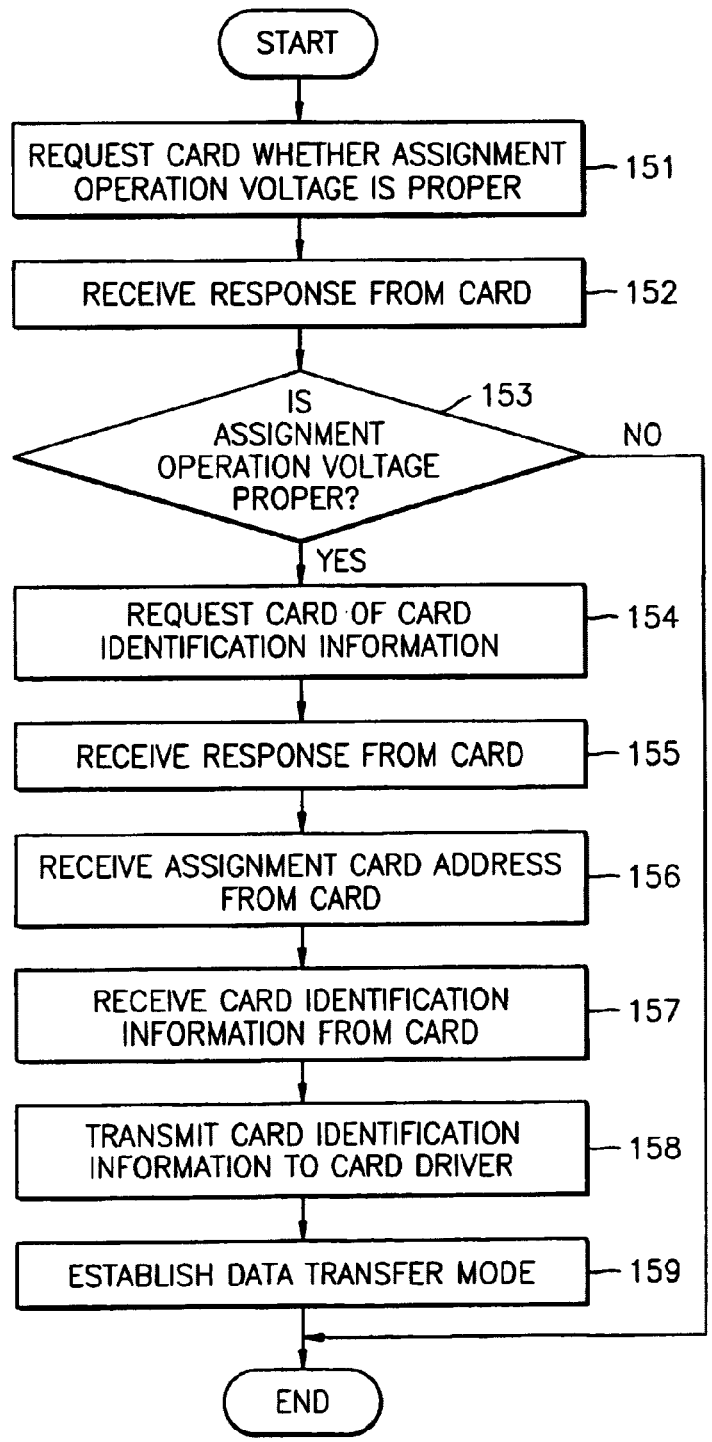
FIG. 15 is a flowchart explaining a method of establishing a data transfer mode through the identification of the insertion of a secure digital card according to an embodiment of the present invention.

FIG. 15 is a flowchart explaining a method of establishing a data transfer mode through the identification of the insertion of a SD card.

In step 151, the SD card is requested for the propriety of an assignment operation voltage that a card driver assigns as an operation voltage of the SD card in consideration of power distribution to the whole of a system. If in step 152, a response to the request is received and the response indicates the propriety of the assignment operation voltage in step 153, in step 156, an assignment card address that the SD card assigns as a relative address of the SD card is received. The following steps may be performed to satisfy the standard specification of a memory card. In other words, if in step 153, the response to the request indicates the propriety of the assignment operation voltage, the SD card is requested for CID in step 154. In steps 155 and 156, a response to the request for the CID and an assignment card address that the SD card assigns as a relative address thereof are received. The CID includes the name of a maker of the SD card and an ID number of the SD card. If in step 157, card identification information set by the SD card is received, the card identification information is transmitted to the card driver in step 158. In step 159, a data transfer mode in which data can be read or written is established according to a command of the card driver. If the SD card can operate within the range of the assignment operation voltage, the card identification information includes the assignment operation voltage set as an operation voltage of the SD card and the assignment card address set as a relative address of the SD card. The card identification information may further include a state for informing that the SD card has been identified.

According to the present invention, considering that a plurality of slots cannot be actually equipped, a data transfer mode can be automatically established at the very time when a card is inserted into a slot without performing predetermined processes specified in the standard specification of a memory card. Thus, a burden on a process of establishing the data transfer mode using software can be reduced and establishing the data transfer mode can be processed using hardware. As a result, the speed for establishing the data transfer mode can be increased. Also, if the card comes out of the slot, the data transfer mode goes to an idle state. Thus, an error occurring during reading/writing data from/in the card can be prevented and power consumption can be reduced.

The above-described embodiments of the present invention can be written as a program, which can be executed in a computer and in a general-purpose digital computer using a computer-readable recording medium.

A data structure used in the embodiments of the present invention can be written on a computer-readable recording medium via several means.

The computer-readable recording medium includes magnetic storage media (e.g., ROMs, floppy discs, hard discs, etc.), optical readers (e.g., CD-ROMs, DVDs, and the like), and a carrier wave (e.g., the transmission over the Internet).

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for establishing a data transfer mode through the identification of the insertion of a card, the apparatus comprising:
   a card insertion identifier that identifies whether the card is inserted;
   a card assignment information receiver that if the card insertion identifier identifies that the card is inserted, receives predetermined card assignment information from a card driver;
   a data transfer mode establisher that establishes the data transfer mode for the card based on the card assignment information; and
   a data transfer mode releaser that if the card insertion identifier identifies in the data transfer mode that the card is no longer inserted, informs the card driver that the card is no longer inserted to release the data transfer mode.

2. The apparatus of claim 1, wherein if the card is inserted into a predetermined socket, the card insertion identifier receives a predetermined insertion signal from a port of the socket coupled to a port of the card to identify that the card is inserted.

3. The apparatus of claim 1, wherein the card is a multimedia card.

4. The apparatus of claim 3, wherein the card assignment information comprises an assignment operation voltage that the card driver assigns as an operation voltage of the card in consideration of power distribution to an entire system including the apparatus and an assignment card address that the card driver arbitrarily assigns as a relative address of the card.

5. The apparatus of claim 1, wherein the card is a secure digital card.

6. The apparatus of claim 5, wherein the card assignment information comprises an assignment operation voltage that the card driver assigns as an operation voltage of the card in consideration of power distribution to an entire system including the apparatus and an assignment card address that the card arbitrarily assigns as a relative address of the card.

7. An apparatus for establishing a data transfer mode through the identification of the insertion of a multimedia card, the apparatus comprising;
   an assignment operation voltage propriety requester that requests the multimedia card to indicate the propriety of an assignment operation voltage that a card driver assigns as an operation voltage of the multimedia card in consideration of power distribution to an entire system including the apparatus;
   an assignment card address transmitter that receives a response to the request of the assignment operation voltage propriety requester and if the response indicates the propriety of the assignment operation voltage, transmits to the multimedia card an assignment card address that the card driver arbitrarily assigns as a relative address of the multimedia card; and
   a data transfer mode establisher that receives predetermined card identification information set by the multimedia card and transmits the card identification information to the card driver to establish the data transfer mode in which data is read or written according to a command of the card driver.

8. The apparatus of claim 7, wherein if the multimedia card operates within the range of the assignment operation voltage, the card identification information comprises the assignment operation voltage set as an operation voltage of the multimedia card and the assignment card address set as a relative address of the multimedia card.

9. The apparatus of claim 8, wherein the card identification information further comprises a state for informing that the multimedia card is identified.

10. The apparatus of claim 7, wherein if the response to the request of the assignment operation voltage propriety requester indicates the propriety of the assignment operation voltage, the assignment card address transmitter requests the multimedia card for card identification information, receives a response to the request for the card identification information, and transmits the assignment card address to the multimedia card.

11. The apparatus of claim 10, wherein the card identification information comprises the name of a maker of the multimedia card and an identification number of the multimedia card.

12. An apparatus for establishing a data transfer mode through the identification of the insertion of a secure digital card, the apparatus comprising:
   an assignment operation voltage propriety requester that requests the secure digital card to indicate the propriety of an assignment operation voltage that a card driver assigns as an operation voltage of the secure digital card in consideration of power distribution to the whole of the apparatus;
   an assignment card address receiver that receives a response to the request of the assignment operation voltage propriety requester and if the response indicates the propriety of the assignment operation voltage, receives an assignment card address that the secure digital card arbitrarily assigns as a relative address of the secure digital card; and a data transfer mode establisher that receives predetermined card identification information set by the secure digital card and transmits the card identification information to the card driver to establish the data transfer mode in which data is read or written according to a command of the card driver.

13. The apparatus of claim 12, wherein if the secure digital card operates within the range of the assignment operation voltage, the card identification information comprises the assignment operation voltage set as an operation voltage of the secure digital card and the assignment card address set as a relative address of the secure digital card.

14. The apparatus of claim 13, wherein the card identification information further comprises a state for informing that the secure digital card is identified.

15. The apparatus of claim 12, wherein if the response to the request of the assignment operation voltage propriety requester indicates the propriety of the assignment operation voltage, the assignment card address receiver requests the card for card identification information and receives a response to the request for the card identification information and the assignment card address that the secure digital card arbitrarily assigns as the relative address of the secure digital card.

16. The apparatus of claim 15, wherein the card identification information comprises the name of a maker of the secure digital card and an identification number of the secure digital card.

17. A method of establishing a data transfer mode through the identification of the insertion of a card, the method comprising:
(a) identifying whether a card is inserted;
(b) if the insertion of the card is identified, receiving predetermined card assignment information from a card driver;
(c) establishing the data transfer mode for the card based on the card assignment and
(d) if the card is no longer inserted, informing the card driver that the card is no longer inserted to release the data transfer mode.

18. The method of claim 17, wherein in step (a), if the card is inserted into a predetermined socket, a predetermined insertion signal is received from a port of the socket coupled to a port of the card to identify that the card is inserted.

19. The method of claim 17, wherein the card is a multimedia card.

20. The method of claim 19, wherein the card assignment information comprises an assignment operation voltage that the card driver assigns as an operation voltage of the card in consideration of power distribution to an entire system and an assignment card address that the card driver arbitrarily assigns as a relative address of the card.

21. The method of claim 17, wherein the card is a secure digital card.

22. The method of claim 21, wherein the card assignment information comprises an assignment operation voltage that the card driver assigns as an operation voltage of the card in consideration of power distribution to an entire system and an assignment card address that the card arbitrarily assigns as a relative address of the card.

23. A method of establishing a data transfer mode through the identification of the insertion of a multimedia card, the method comprising:
(a) requesting the multimedia card to indicate the propriety of an assignment operation voltage that a card driver assigns as an operation voltage of the multimedia card in consideration of power distribution to an entire system;
(b) receiving a response to the request and if the response indicates the propriety of the assignment operation voltage, transmitting to the multimedia card an assignment card address that the card driver arbitrarily assigns as a relative address of the multimedia card; and
(c) receiving predetermined card identification information set by the multimedia card and transmitting the card identification information to the card driver to establish the data transfer mode in which data is read or written according to a command of the card driver.

24. The method of claim 23, wherein if the multimedia card operates within the range of the assignment operation voltage, the card identification information comprises the assignment operation voltage set as an operation voltage of the multimedia card and the assignment card address set as a relative address of the multimedia card.

25. The method of claim 24, wherein the card identification information further comprises a state for informing that the multimedia card is identified.

26. The method of claim 23, wherein in step (b), if a response to the request indicates the propriety of the assignment operation voltage, the multimedia card is requested for card identification information, a response to the request for the card identification information is received, and the assignment card address is transmitted to the multimedia card.

27. The method of claim 23, wherein the card identification information comprises the name of a maker of the multimedia card and an identification number of the multimedia card.

28. A method of establishing a data transfer mode through the identification of the insertion of a secure digital card, the method comprising:
(a) requesting the secure digital card to indicate the propriety of an assignment operation voltage that a card driver assigns as an operation of the secure digital card in consideration of power distribution to an entire system;
(b) receiving a response to the request and if the response indicates the propriety of the assignment operation voltage, receiving an assignment card address that the secure digital card arbitrarily assigns as a relative address of the secure digital card; and
(c) receiving predetermined card identification information set by the secure digital card and transmitting the card identification information to the card driver to establish the data transfer mode in which data is read or written according to a command of the card driver.

29. The method of claim 28, wherein if the secure digital card operates within the range of the assignment operation voltage, the card identification information comprises the assignment operation voltage set as an operation voltage of the secure digital card and the assignment card address set as a relative address of the secure digital card.

30. The method of claim 29, wherein the card identification information further comprises a state for informing that the secure digital card is identified.

31. The method of claim 28, wherein in step (b), if the response to the request indicates the propriety of the assignment operation voltage, card identification information is requested, and a response to the request for the card identification information and the assignment card address that the secure digital card arbitrarily assigns as a relative address of the secure digital card are received.

32. The method of claim 31, wherein the card identification information comprises the name of a maker of the secure digital card and an identification number of the secure digital card.

33. A computer-readable recording medium on which a program for executing the method of any one of claims 17 through 32 in a computer is written.

34. A register of a controller for controlling a card, which establishes a data transfer mode through the identification of the insertion of a card, the register comprising:
   an assignment operation voltage storage unit that stores an assignment operation voltage;
   an assignment card address storage unit that stores an assignment card address;
   a set operation voltage storage unit that stores a set operation voltage; and
   a set card address storage unit that stores a set card address.

35. The register of claim 34, wherein the assignment operation voltage is a voltage that a card driver assigns as an operation voltage of the card in consideration of power distribution to an entire system.

36. The register of claim 34, wherein if the card is a multimedia card, the assignment card address is an address that the card driver arbitrarily assigns as a relative address of the card, and if the card is a secure digital card, the assignment card address is an address that the card arbitrarily assigns as a relative address of the card.

37. The register of claim 34, wherein if the card operates within the range of the assignment operation voltage, the set operation voltage is the assignment operation voltage set as an operation voltage of the card.

38. The register of claim 34, wherein the set card address is the assignment card address set as a relative address of the card.

39. The register of claim 34, further comprising a card identification status storage unit that stores a state for informing that the card is identified.

* * * * *